United States Patent
Knausz et al.

(10) Patent No.: US 9,304,625 B2
(45) Date of Patent: Apr. 5, 2016

(54) SYNCHRONIZING A SWITCHED POWER SUPPLY

(71) Applicant: Synaptics Incorporated, San Jose, CA (US)

(72) Inventors: Imre Knausz, Fairport, NY (US); Christopher Ludden, Pittsford, NY (US); Thomas Mackin, Rochester, NY (US); Murat Ozbas, Rochester, NY (US); Mark Pude, Victor, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 135 days.

(21) Appl. No.: 13/931,529

(22) Filed: Jun. 28, 2013

(65) Prior Publication Data
US 2015/0002407 A1    Jan. 1, 2015

(51) Int. Cl.
| | |
|---|---|
| *G06F 3/041* | (2006.01) |
| *G09G 3/20* | (2006.01) |
| *H02M 1/44* | (2007.01) |
| *H02M 3/07* | (2006.01) |
| *H02M 3/156* | (2006.01) |

(52) U.S. Cl.
CPC ............... *G06F 3/0418* (2013.01); *G09G 3/20* (2013.01); *H02M 1/44* (2013.01); *H02M 3/07* (2013.01); *H02M 3/156* (2013.01)

(58) Field of Classification Search
None
See application file for complete search history.

(56) References Cited

U.S. PATENT DOCUMENTS

| | | | |
|---|---|---|---|
| 2002/0050973 A1* | 5/2002 | Takaoka et al. | 345/100 |
| 2002/0126114 A1* | 9/2002 | Yatabe | 345/212 |
| 2005/0052428 A1* | 3/2005 | Hayashi et al. | 345/173 |
| 2006/0261798 A1 | 11/2006 | Brassfield et al. | |
| 2007/0191073 A1 | 8/2007 | May et al. | |
| 2008/0117177 A1 | 5/2008 | Ko et al. | |
| 2008/0129264 A1 | 6/2008 | Moussaoui et al. | |
| 2009/0086518 A1 | 4/2009 | Currie | |
| 2009/0284179 A1* | 11/2009 | Ray et al. | 315/306 |
| 2011/0115729 A1 | 5/2011 | Kremin et al. | |
| 2011/0193817 A1 | 8/2011 | Byun et al. | |
| 2012/0287081 A1 | 11/2012 | Akai et al. | |
| 2013/0044265 A1* | 2/2013 | Sasaki | 348/731 |

OTHER PUBLICATIONS

International Search Report and Written Opinion dated Sep. 14, 2014 for Application PCT/2014/039756 consists of 10 pages.

* cited by examiner

*Primary Examiner* — Adam R Giesy
*Assistant Examiner* — Henok Heyi
(74) *Attorney, Agent, or Firm* — Patterson + Sheridan, LLP

(57) ABSTRACT

Embodiments described herein synchronize a switching frequency of switched power supplies with timing events associated with updating a display screen or performing touch sensing. For example, a touch event may be the time needed for a touch controller to scan a plurality of sensing electrodes. Because noise is introduced each time switched power supplies switch between different stages, the touch controller may instruct a power management controller to switch between the stages (i.e., adjust the switching frequency) at the same time during each touch event. Even though the switched power supplies are permitted to introduce noise into the touch system, the noise happens at the same time during each touch event. Accordingly, the effect of the noise is the same for each touch event and is cancelled out. A similar process may be used for synchronizing the switching frequency to display events.

22 Claims, 7 Drawing Sheets

SYNCHRONIZING A SWITCHED POWER SUPPLY

BACKGROUND OF THE INVENTION

1. Field of the Invention

Embodiments of the present invention generally relate to managing noise generated by an external switched power supply, and more specifically, to synchronizing a switching frequency of the switched power supply to a touch or display event in a processing system.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

One embodiment described herein is an electronic device including a power management controller configured to provide power to both a display controller configured to update a display screen and a touch controller configured to detect interaction between an input object and a sensing region. The power management controller is configured to communicate with the display and touch controllers to adjust a switching frequency of a power supply to be synchronous with display timing and touch timing.

Another embodiment described herein is a method for synchronizing a power management controller. The method includes providing power from a power management controller to both a display controller configured to update a display screen and a touch controller configured to detect interaction between an input object and a sensing region. The method includes communicating with the display and touch controllers to adjust a switching frequency of a power supply to be synchronous with display timing and touch timing.

Another embodiment described herein is an integrated circuit system comprising a power management controller configured to provide power to both a display controller configured to update a display screen and a touch controller configured to detect interaction between an input object and a sensing region. The integrated circuit further includes a switched power supply where the power management controller is configured to communicate with the display and touch controllers to adjust a switching frequency of the switched power supply to be synchronous with display timing and touch timing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
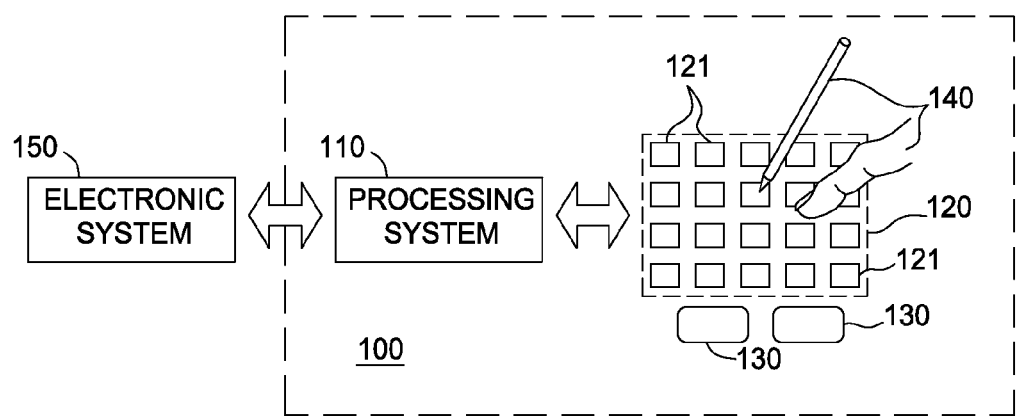
FIG. 1 is a schematic block diagram of an exemplary input device, according to an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability.

A display controller may include one or more internal power supplies that generate the voltage necessary to update a display screen in an electronic device. However, as display resolution (i.e., pixel density) continues to increase, the power required to operate the display increases. Instead of generating the voltages internally, the display controller may rely on external power supplies for providing the voltages needed to update the display screen. Specifically, the display controller may couple to a power management controller (e.g., a power management integrated circuit (PMIC)) which provides the various voltages for driving the pixels on the display screen. The power management controller may be coupled to a power storage element (e.g., a battery) or to a power grid using, for example, an AC-DC convertor. The power management controller may include a plurality of different power supplies that supply various voltages to the display controller.

To generate the various voltages, the power supplies may be switched power supplies that use inductive boost circuits or charge pumps to change the DC voltage provided by the power storage element or power grid into a DC voltage desired by the display controller for updating the display.

However, the switched power supplies may use a switching frequency for performing the DC-DC conversion that introduces noise into the display controller which can affect the quality of an image outputted on the display screen. In addition to affecting display updating, if the power management controller also provides voltages used during touch sensing, the noise can negatively affect the ability of a touch controller to detect user interaction with a touch-sensitive area in the electronic device.

One solution to manage the noise generated by switch power supplies is to design the circuits in the electronic device to include high power supply rejection (PSR) ratios. However, this may add cost and bulk to the design of the electronic device. Moreover, in some embodiments, it may be impossible to prevent the noise from indirectly coupling into the display or touch systems even when circuits that interface with the switched power supplies have high PSR ratios. Instead, embodiments described herein synchronize the switching frequency of the switched power supplies with the timing events associated with updating a display screen or performing touch sensing. For example, a touch event may be the time needed for the touch controller to scan a plurality of sensing electrodes. Because the noise is introduced each time the power supplies switch between different stages, the touch controller may instruct the power management controller to switch between the stages (i.e., adjust the switching frequency) at the same time during each touch event. For example, the switched power supply may change stages at the beginning and in the middle of each time event. Even though the switched power supplies still introduce noise into the touch system, the noise happens at the same time during each touch event. Accordingly, the effect of the noise is the same for each touch event, and thus, is cancelled out. A similar process may be done during display updating.

In one embodiment, the touch events may have a different duration than the display events. Accordingly, the switching frequency used by the switched power supplies when the electronic device is updating the display may be different than when the device is performing touch sensing. To inform the power management controller how to adjust the switching frequency, the touch and display controllers may have a communication path to the power management controller. For example, the touch and display controllers may maintain shadow registers that permit these controllers to push out notifications to the power management controller instructing it change the switching frequency of its power supplies. In this manner, the noise generated by the external power supplies may be mitigated by synchronizing the switching frequency with the touch or display events in the electronic device instead of relying only on designing circuits with high PSR ratios.

FIG. 1 is a block diagram of an exemplary input device 100, in accordance with embodiments of the present technology. Although embodiments of the present disclosure may be utilized in an input device 100 including a display device integrated with a sensing device, it is contemplated that the invention may be embodied in display devices without integrated sensing devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zerodimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device 101. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 101 may share physical elements. For example, some embodiments may utilize some of the same electrical components for displaying and sensing. As another example, the display device 101 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
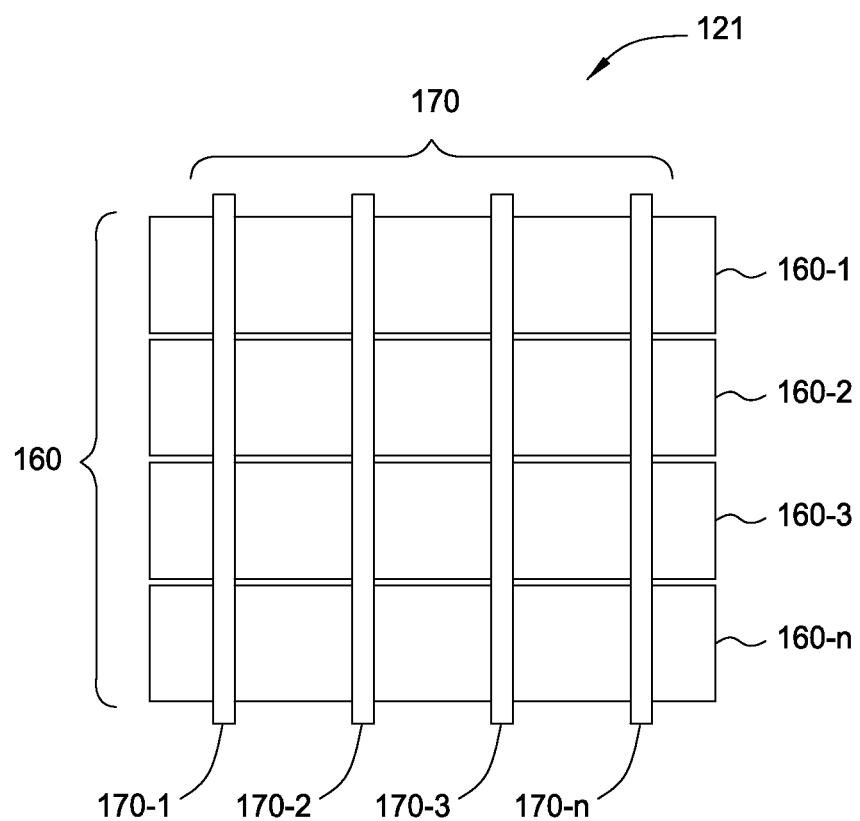
FIG. 2 illustrates a stack-up of a sensor assembly that may be used in the input device to sense the input object, according to an embodiment described herein.

FIG. 2 shows a portion of an exemplary pattern of sensing elements 121 configured to sense in a sensing region associated with the pattern, according to some embodiments. For clarity of illustration and description, FIG. 2 shows the sensing elements 121 in a pattern of simple rectangles, and does not show various components. This pattern of sensing elements 121 comprises a first plurality of sensor electrodes 160 (160-1, 160-2, 160-3, . . . 160-n), and a second plurality of sensor electrodes 170 (170-1, 170-2, 170-3, . . . 170-n) disposed over the plurality of transmitter electrodes 160. In one embodiment, this pattern of sensing elements 121 comprises a plurality of transmitter electrodes 160 (160-1, 160-2, 160-3, . . . 160-n), and a plurality of receiver electrodes 170 (170-1, 170-2, 170-3, . . . 170-n) disposed over the plurality of transmitter electrodes 160. In another embodiment, the first plurality of sensor electrodes may be configured to transmit and receive and the second plurality of sensor electrodes may also be configured to transmit and receive.

Transmitter electrodes 160 and receiver electrodes 170 are typically ohmically isolated from each other. That is, one or more insulators separate transmitter electrodes 160 and receiver electrodes 170 and prevent them from electrically shorting to each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, transmitter electrodes 160 comprise one or more common electrodes (e.g., "V-com electrode" or source drive electrode) used in updating the display of the display screen. These common electrodes may be disposed on an appropriate display screen substrate. For example, the common electrodes may be disposed on the TFT glass in some display screens (e.g., In Plane Switching (IPS) or Plan to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each transmitter electrode 160 comprises one or more common electrodes. In other embodiments, at least two transmitter electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g. combination electrodes). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate.

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats. In some embodiments, there may be "n" capacitive images for every display updating state.

Figure 3:
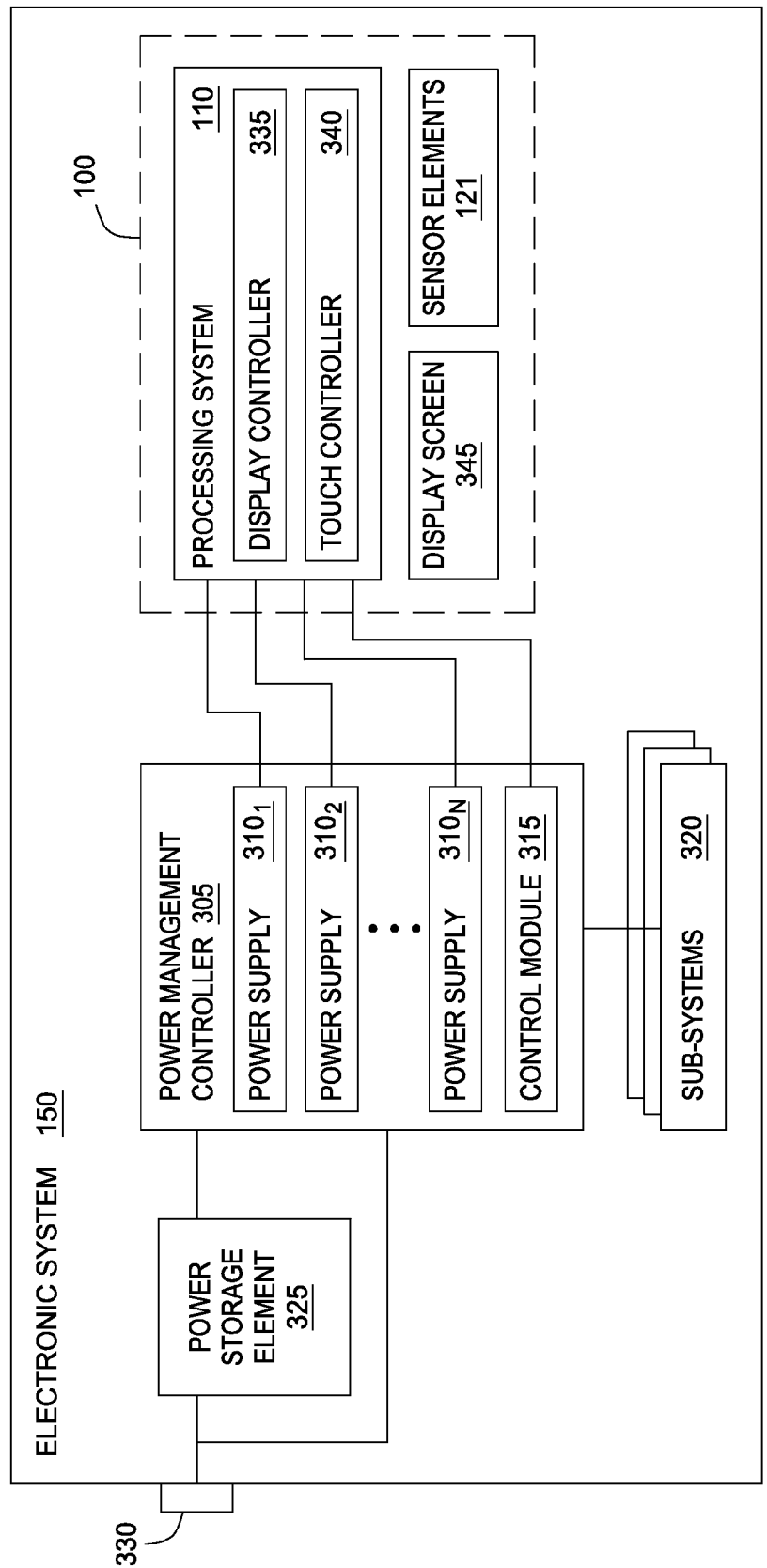
FIG. 3 is a schematic block diagram of an exemplary electronic system, according to an embodiment described herein.

FIG. 3 is a schematic block diagram of an exemplary electronic system 150, according to an embodiment described herein. As shown, the electronic system 150 includes input device 100 and processing system 110. The processing system 110 includes a display controller 335 which updates the display screen 345 according to received display data and a display frame rate. For example, the display controller 335 may raster through each row in the display screen 345 and update the pixels (e.g., red, green, and blue) in each row. In one embodiment, the time used to update a display frame, or a portion thereof, may define a "display event." The display screen 345 may include any type of light emitting diode (LED), organic LED (OLED), cathode ray tube (CRT), liquid crystal display (LCD), plasma, electroluminescence (EL), or other display technology.

Processing system 110 also includes a touch controller 340. As such, processing system 110 may represent a single integrated circuit, or a system of integrated circuits, configured to perform both display updating and touch sensing. Touch controller 340 may drive transmitter signals on the sensor elements 121 discussed in FIGS. 1 and 2 to detect interaction between input objects and the sensing region. In one embodiment, processing system 110 may ensure that when the display controller 335 is updating the display screen 345, the touch controller 340 is not performing touch sensing using the sensor elements 121, and vice versa. For example, the sensor elements 121 may be integrated into the display screen 345 and may be used by both the display and touch controllers 335, 340 when performing their respective functions. As such, only one controller 335, 340 can use the shared sensor elements 121 at any given time. Moreover, even if a portion of the sensor elements 121 are not shared by the controllers 335, 340, processing system 110 may nonetheless ensure that display updating does not overlap with touch sensing to reduce the likelihood that one function will negatively impact the other (e.g., prevent cross-talk). However, in another embodiment, display updating and touch sensing may overlap in time—e.g., at least a portion of the functions are performed simultaneously. Although FIG. 3 illustrates a processing system that includes both a display controller 335 and a touch controller 340, the embodiments disclosed herein may also be applied to an electronic device where the display and touch controllers are not located on the same processing system—i.e., the display and touch controllers are part of independent systems.

Electronic system 150 further includes a power management controller (PMC) 305, power storage element 325, and various sub-systems 320. In one embodiment, PMC 305 may be a separate integrated circuit—i.e., a PMIC—mounted in the electronic system 150. PMC 305 includes a plurality of power supplies $310_{1-n}$ that may output the same or different voltages. Specifically, power supplies 310 may perform a DC-DC voltage conversion using either the output of the power storage element 325 (e.g., a battery or other electrical storage device) or a power converter (e.g., AC-DC or DC-AC) coupled to the electronic system 150 via the interface 330. For example, the power converter may be a battery charger if the electronic system 150 is a mobile device such as a phone, laptop, tablet, and the like. As shown here, PMC 305 has a direct connection to interface 330, and thus, may be able to receive power directly from a connected AC-DC converter instead of indirectly through the power storage element 325, however, this is not a requirement. Moreover, in other embodiments, electronic system 150 (e.g., a desktop computer) may not include the power storage element 325 and instead rely only on an internal or external power converter to power the power supplies 310 on the PMC 305.

Power supplies 310 use the power from the power storage element 325 or the power converter to output a voltage for use in the processing system 110. Power supplies 310 may perform a DC-DC conversion to output the specific voltage or voltages desired by the processing system 110. For example, the power storage element 325 may output a 4V signal. One of the power supplies 310, e.g., power supply $310_1$, may convert the 4V signal to a 2.2V signal which is then provided to processing system 110. Over time, the voltage output of the power storage element 325 may deplete. As such, a control module 315 on the PMC 305 may adjust the DC-DC conversion being performed on the power supplies 310 such that the voltage output to processing system 110 remains constant. For example, if the output of power storage element 325 falls from 4V to 3V, power supply $310_1$ still provides processing system 110 with 2.2V.

In addition to monitoring the output voltage of the power storage element 325, control module 315 may facilitate communication between PMC 305 and the display and touch controllers 335, 340. For example, processing system 110 may request different voltages from the power supplies 310 depending on what function the processing system 110 is performing. In one embodiment, updating the display may use different voltages than performing touch sensing. Instead of dedicating different power supplies 310 to the different functions, the display and touch controllers 335, 340 may inform control module 315 which function is currently taking place in processing system 110. Based on this information, control module 315 may adjust power supplies 310 to provide voltage outputs corresponding to the function being performed by processing system 110.

PMC 305 may provide voltages to other sub-systems 320 in electronic system 150 besides processing system 110. For example, some of the power supplies 310 may be dedicated to providing voltages to processing system 110 while other power supplies 310 provide voltages to the other sub-systems 320. In one embodiment, the power supplies may be shared. For example, if a sub-system 320 needs the same voltage as the processing system 110, the two sub-systems may both be coupled to the same output of a power supply 310.

Figure 4:
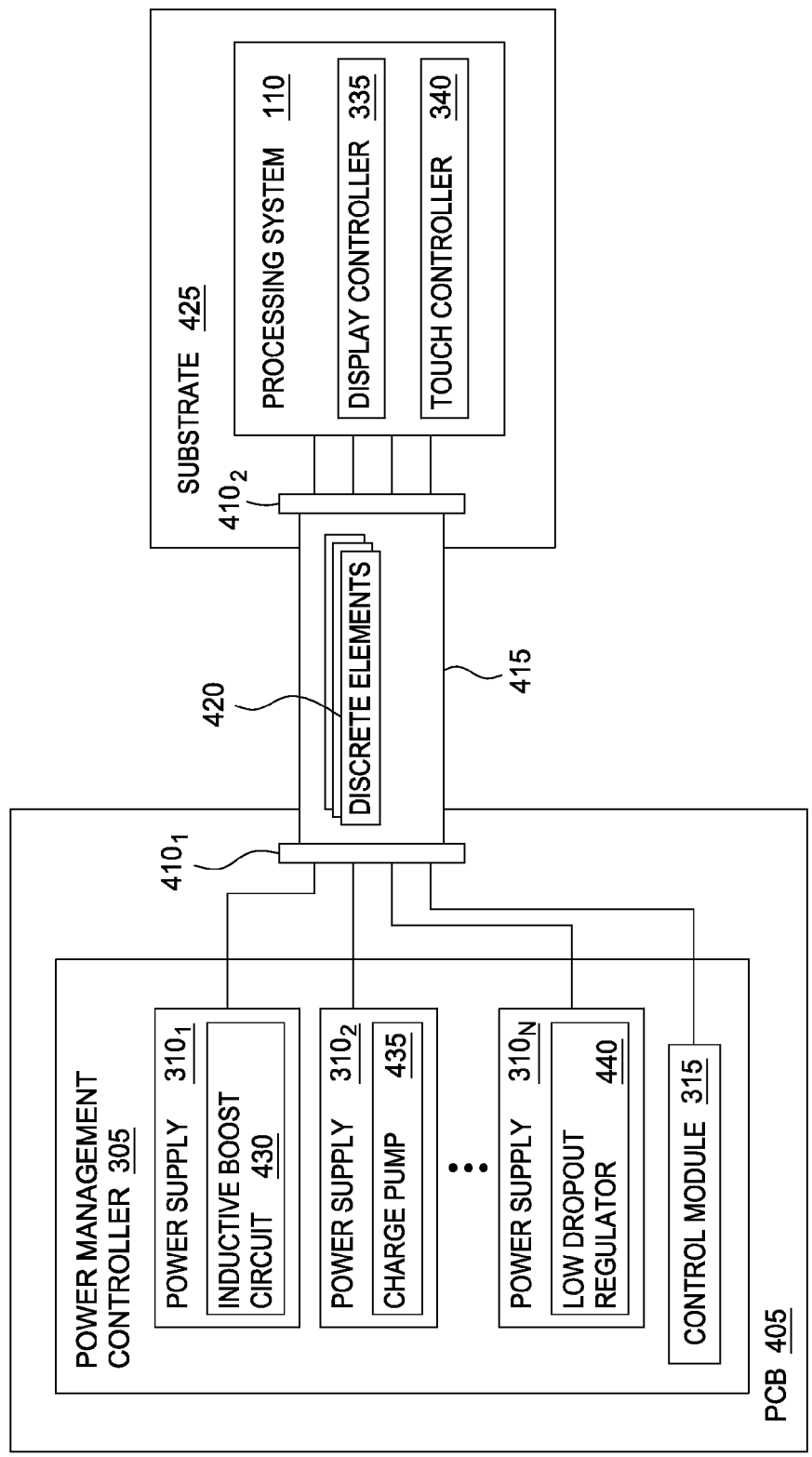
FIG. 4 illustrates a processing system coupled to a power management controller, according to an embodiment described herein.

FIG. 4 illustrates processing system 110 coupled to PMC 305, according to an embodiment described herein. As shown, PMC 305 is mounted on a printed circuit board (PCB) 405. The PCB 405, in one embodiment, may be the main PCB for the electronic system. Using a plurality of traces on PCB 405, the various power supplies 310 may deliver power to a connector 410. Similarly, PCB 405 may provide one or more traces used by control module 315 for transferring data between PMC 305 and processing system 110. The communication method used to transmit data between control module 315 and processing system 110 is not limited to any particular technique and may include serial or parallel data communication—e.g., serial peripheral interface (SPI) communication, I²C, and the like.

Connector $410_1$ may communicatively and physically couple the PCB 405 to interconnect 415. In one embodiment, interconnect 415 may be flexible (e.g., a flexible PCB) to allow PCB 405 and substrate 425 to have any desired orientation relative to each other. For example, a flexible interconnect 415 may permit PCB 405 and substrate 425 to be oriented in a stack arrangement when mounted in the electronic system. Connector $410_2$ may communicatively and physically couple the interconnect 415 to substrate 425. Like PCB 405, substrate 425 may include a plurality of traces that couple processing system 110 to the output of the power supplies 310. Additionally, substrate 425 may have traces for transmitting data between controllers 335, 340 in processing system 110 with control module 315 in PMC 305. In one embodiment, substrate 425 may be a glass substrate on which the processing system 110 is mounted. Although not shown, the substrate 425 may also include a display screen for displaying an image to a user and sensor elements for performing touch sensing.

FIG. 4 illustrates that the power supplies 310 in PMC 305 may be of various types—e.g., switched power supplies that use a different stages to provide a desired output voltage or non-switched power supplies that use linear methods for outputting a voltage. Here, power supplies $310_1$ and $310_2$ use an inductive boost circuit 430 and a charge pump 435, respectively, to perform DC-DC conversion. Because the inductive boost circuit 430 and charge pump 435 rely on switching between different states to convert one DC voltage to a different DC voltage (either higher or lower), power supplies $310_1$ and $310_2$ are switched power supplies. For example, charge pump 435 may switch between two states based on a defined duration (i.e., a switch frequency) which is adjusted and controlled by control module 315. To provide a larger voltage than the supplied voltage (e.g., to go from 5V to 10V), during the first state, a capacitor may be connected across a voltage supply (e.g., a battery or an AC-DC convertor) which charges the capacitor to the same voltage. During the second state, switches in the charge pump 435 reconfigure the circuit such that the capacitor is in series with the voltage supply thereby doubling the output voltage of power supply $310_2$. Control module 315 may drive the switches at any switching frequency, but typical switching frequencies range from tens of kilohertz to several megahertz. The embodiments described herein are not limited to any particular type of charge pump 435 design. For example, charge pump 435 may be used to decrease or increase a supplied DC voltage to any desired output DC voltage, use more than two states in a charging cycle, or operate at any desired switching frequency.

Inductive boost circuit 430 may function similar to a charge pump 435 in that it also uses multiple states to perform a DC-DC conversion. In one embodiment the inductive boost circuit 430 uses a switch to force current through an inductor used to store additional charge in a capacitor. The additional charge increases the output voltage of the power supply 310. The amount of charge on the capacitor may be controlled by the duty cycle of the control signal (i.e., the switching frequency) used to control the switch. The embodiments described herein, however, are not limited to any particular design or implementation of the inductive boost circuit 430.

Switched power supplies $310_1$ and $310_2$ may produce noise spikes when switching between the states or stages. For example, noise spikes may occur when the switches (e.g., transistors) in the indicative boost circuit 430 and charge pump 435 cause the respective circuit to go from one state to the other. The interval at which the switches change the state is referred to herein as the switching frequency. In one embodiment, the control module may include logic for monitoring and adjusting the switching frequency. In addition to determining how long the switch power supplies remain in a particular state, control module 315 may change the "phase" of the switching frequency—i.e., either advance or delay the control signal that defines the switching frequency. Because the control module 315 may be configured to control both the duration of the stages as well as the phase of the switching frequency, control module 315 is capable of synchronizing the switching frequency with other events in the electronic system. As will be discussed in greater detail later, control module 315 may communicate with the display and touch controllers 335, 340 to synchronize the switching frequency of the switched power supplies to mitigate the effects of the noise spikes.

In one embodiment, the switched power supplies $310_1$ and $310_2$ use discrete elements 420 that are located on the interconnect 415 (e.g., a flexible PCB). For example, the discrete elements 420 may include the capacitors or inductors needed by the inductive boost circuit 430 or charge pump 435 to perform DC-DC conversion. However, in other embodiments, the discrete elements may be mounted elsewhere such as PCB 405 or integrated into the PMC 305. In addition, processing system 110 may include other power supplies (not shown) which use the discrete elements 420 located on the interconnect 415.

Because power supply $310_N$ uses a low dropout (LDO) regulator 440 to perform DC-DC conversion (which is a linear operation), power supply $310_N$ is a non-switched power supply. That is, power supply $310_N$ may not use a switching frequency or charge storage elements (e.g., capacitors or inductors) for performing DC-DC conversion. As such, power supply $310_N$ may not be as likely to produce noise spikes like the switch power supplies. Although FIG. 4 illustrates three different examples of switched and non-switched power supplies, the present embodiments are not limited to such. For example, FIG. 4 may include different types of switched or non-switched power supplies as well as multiple power supplies that use the same DC-DC conversion technique (e.g., multiple power supplies that use inductive boost circuit 430).

Figure 5:
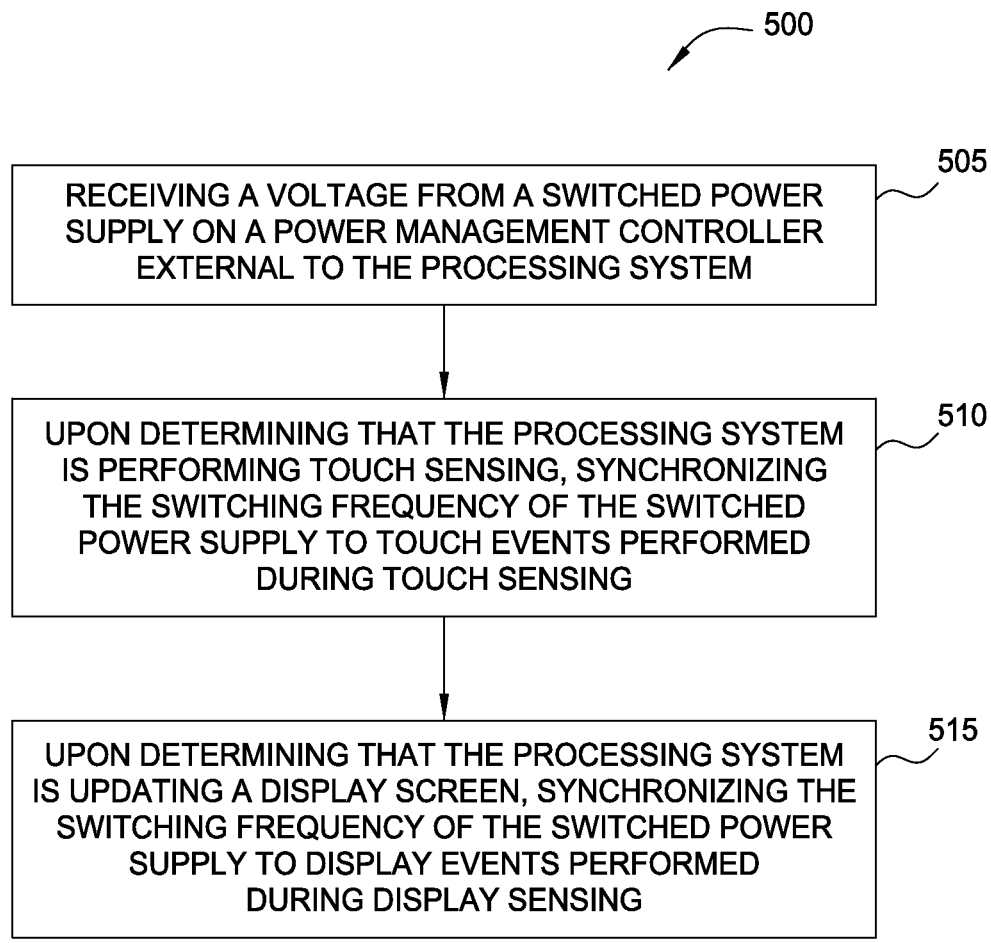
FIG. 5 illustrates a method for changing a switching frequency of a power supply based on a state of the processing system, according to an embodiment described herein.

FIG. 5 illustrates a method 500 for changing a switching frequency of a power supply based on a state of the processing system, according to an embodiment described herein. At block 505, a processing system coupled to a PMC receives one or more output voltages from power supplies located on the PMC. The display and touch controllers may use the output voltages to update an image on a display screen or perform touch sensing.

In one embodiment, display updating and touch sensing may be performed during time periods that do not overlap. That is, the touch controller may perform touch sensing during a fixed interval and then hand off control to the display controller for updating an image (or a portion of the image) on the display screen. In one embodiment, the sensing region used for touch sensing may be integrated into the display screen—e.g., the display screen may contain the sensing elements 121 shown in FIG. 1. Because the display controller and touch controller may share components to perform their respective functions or because of cross-talk, the processing system may perform touch sensing at different times than display updating.

At block 510, the processing system may transmit a message to the PMC informing the control module on the PMC that the processing system is currently performing touch sensing. Specifically, the touch controller may transmit the duration of a touch event to the control module. Based on the duration of the touch event, the control module may synchronize the switching frequency of the switched power supplies such that the noise spikes caused by switching between stages in the power cycle occur at the same time during sequential touch events. Note that synchronizing the switched power supplies to the touch events does not imply that the frequencies associated with the power supply switching and the touch events must be the same. In one embodiment, the frequencies may be different but related—e.g., one frequency may be an integer multiple of the other. This synchronization is shown in FIG. 6.

Figure 6:
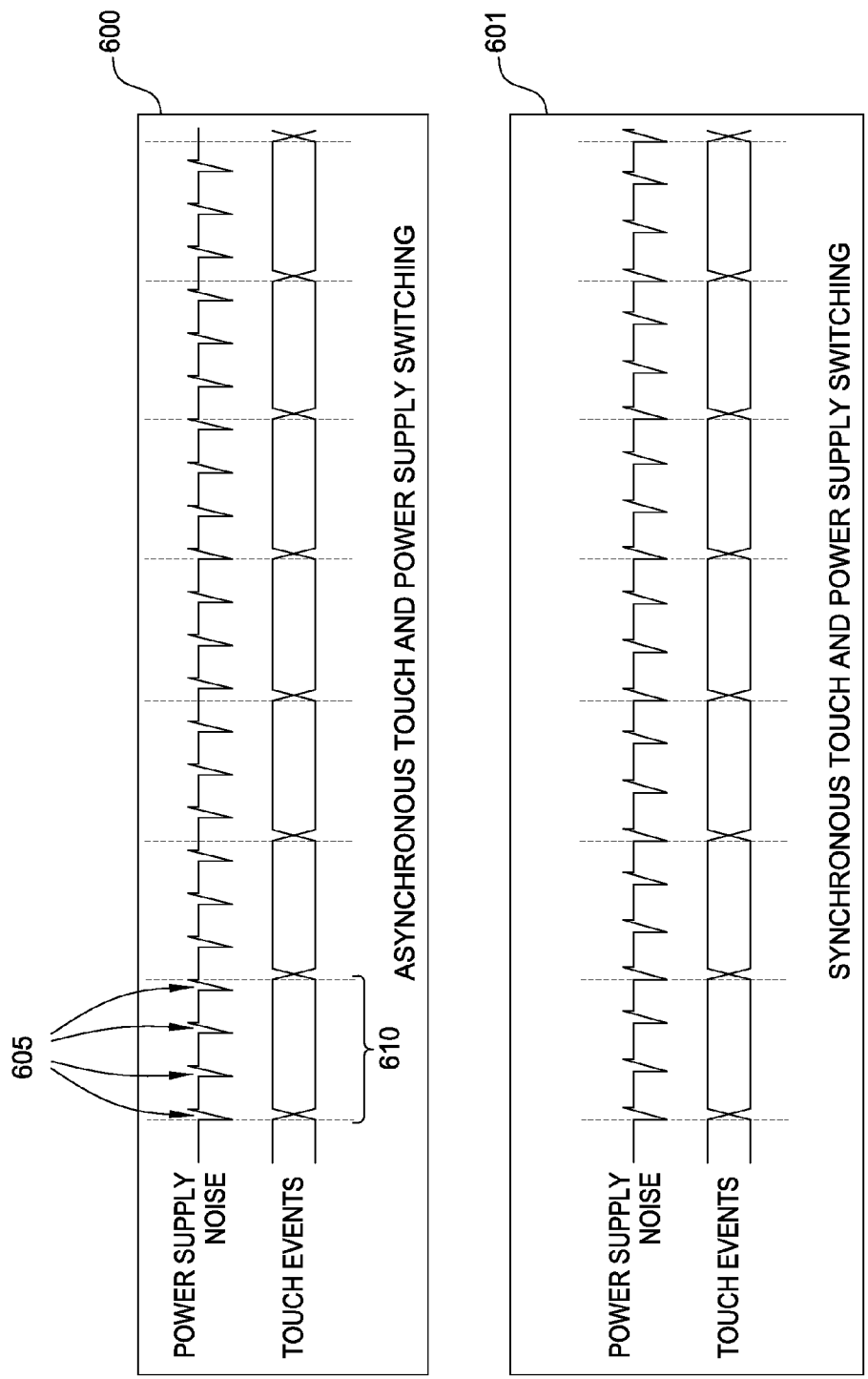
FIG. 6 illustrates a relationship between noise generated by a power supply and touch events, according to an embodiment described herein.

FIG. 6 illustrates a relationship between noise generated by a power supply and touch events, according to an embodiment described herein. Chart 600 illustrates power supply noise that is asynchronous to touch events 610. In one embodiment, the touch event may be the time needed for the touch controller to generate a capacitive image of a portion of the sensing region. For example, the touch controller may generate a transmitter signal on a transmitter electrode to determine if an input object is interacting with the sensing region associated with the transmitter electrode. The time needed for the touch controller to generate a plurality of transmitter signals on the transmitter electrode may set the duration of the touch event 610. Alternatively, the touch event 610 may be the time needed for the touch controller to send the transmitter signal on a plurality of transmitter electrodes (e.g., by rastering through the electrodes). Touch events 610 may also include the time needed to perform additional calculations such as generating the capacitive image based on the resulting signals received on the receiver electrodes. Stated generally, the touch events 610 define time slots of the same length during which the touch controller performs the same or similar operation.

Chart 600 illustrates noise spikes 605 that occur when the switched power supplies in the PMC change states during a DC-DC conversion. For example, the noise spikes 605 may be caused by the inductive boost circuit, a charge pump, and the like. As shown in chart 600, the number of noise spikes 605, as well as their occurrence, within a touch event 610 various relative to subsequent touch events 610. That is, the first touch event 610 has four noise spikes 605—the first spike 605 occurs at the beginning, the second and third spikes 605 are in the middle, and the fourth spike 605 is at the end. The second touch event 610, in contrast, has only three noise spikes 605 which occur at different times within the second touch event 610 relative to the times the noise spikes 605 occurred in the first touch event 610. Because the noise spikes 605 occur at different times within the touch events 610, comparing the touch events 610 is difficult. For example, if each touch event 610 generates respective capacitive images which are then compared to determine whether an input object interacted with the sensing region, noise spikes 605 may create variation between the capacitive images that may lead to erroneous results. That is, the touch controller may identify differences between the capacitive images that are caused by the noise spikes rather than the input object.

To cancel out the effects of the noise spikes 605, chart 601 illustrates synchronizing the switching frequency of the power supplies with the touch events 610. Specifically, the control module of the PMC may change the switching frequency such that the noise spikes 605 caused by switching between states occur at the same time in each touch event. Here, there are four noise spikes 605 during each touch event 610 which occur at the same time during each touch event 610. Because the noise spikes 605 occur at the same time in each touch event 610, the effects of the noise spikes 605 are cancelled out. Stated differently, because the noise spikes 605 affect each time event 610 the same, when the results calculated during the respective touch events 610 are compared, the noise spikes 605 cancel. In one embodiment, the control module may also adjust the phase of the control signal such that at least one of the noise spikes occurs at the beginning or end of the touch events 610 in order to further mitigate the effect of the noise spikes 605 on touch sensing, but this is not a requirement.

In one embodiment, the touch controller informs the control module on the PMC of the duration of the touch events 610. Based on this duration, the control module calculates a switching frequency that synchronizes the noise spikes 605 with the touch events—i.e., ensures the noise spikes 605 occur at the same time in each of the touch events. Stated differently, the noise spike 605 and touch events may be phase locked so that the spikes 605 occur at the same time in the touch events. Even though the switching frequency changes, the control module may change the frequency (or change other settings in the power supplies) in a manner that keeps the output of the power supply constant. For example, if the power supply provided 5V when the switching frequency was asynchronous with the touch events 610 as shown in chart 600, the power supply still provides 5V when the switching frequency is changed in chart 601 to be synchronous with the touch events 610.

Returning to the method 500 of FIG. 5, at block 515, the processing system may inform the control module of the external PMC that the processing system is currently updating the display. Similar to touch sensing, display updating may be divided into a plurality of equally spaced display events—e.g., a display line time or a display frame update. In one embodiment, if the display line time used by the display controller is an integer multiple of the switching period of the power supplies (i.e., the time between noise spikes) then the noise spikes 605 shown in FIG. 6 do not affect the image generated on the display screen. In contrast, if dividing the display line time with the switching period of the power supplies yields a non-integer value, the noise spikes may generate image artifacts in the displayed image.

Accordingly, in response to the processing system updating the display, the control module may adjust the switching frequency to ensure the time periods of the stages is an integer multiple of the display line times—i.e., the display event. For example, the display controller may transmit a message to the control module that provides the display line time being used. Based on this time, the control module may adjust the switching frequency such that the noise spikes do not generate image artifacts or the image artifacts are lessened relative to not synchronizing the switching frequency with the display events.

In one embodiment, the switching frequency used during touch sensing is different from the switching frequency used during display updating. That is, when the processing system changes from performing touch sensing to display updating, or vice versa, the control module may change the switching frequency. Thus, no one switching frequency synchronizes with both touch events and display events. As such, the processing system may maintain communication with the PMC to instruct the PMC when to adjust the switching frequency based on the particular function the processing system is performing. Because the PMC may include multiple switched power supplies that provide output voltages to the processing system, the control module may adjust the switching frequencies of each of the switched power supplies to ensure the noise peaks are synchronized to the touch and display events. In one embodiment, the PMC may adjust the switching frequency prior to a touch or display event. For example, a control loop responsible for adjusting the output voltage of a switched power supply may require some settling time before the output stabilizes at the new frequency. As such, the PMC may adjust the switching frequency before the touch or display controllers initiate the touch or display events.

In one embodiment of method 500, display updating and touch sensing may be performed simultaneously. That is, for at least some of the time that the processing system performs display updating, the system may also perform touch sensing to determine if an input object is interacting with a sensor region. The PMC may have separate switched power supplies for providing respective DC voltages for display updating and touch sensing. Thus, the power supplies used for display updating may use a different switching frequency relative to the power supplies used for performing touch sensing. In this manner, the processing system may benefit from the advantages described above even if the touch events and the display events do overlap—i.e., display updating and touch sensing are performed simultaneously.

Figure 7:
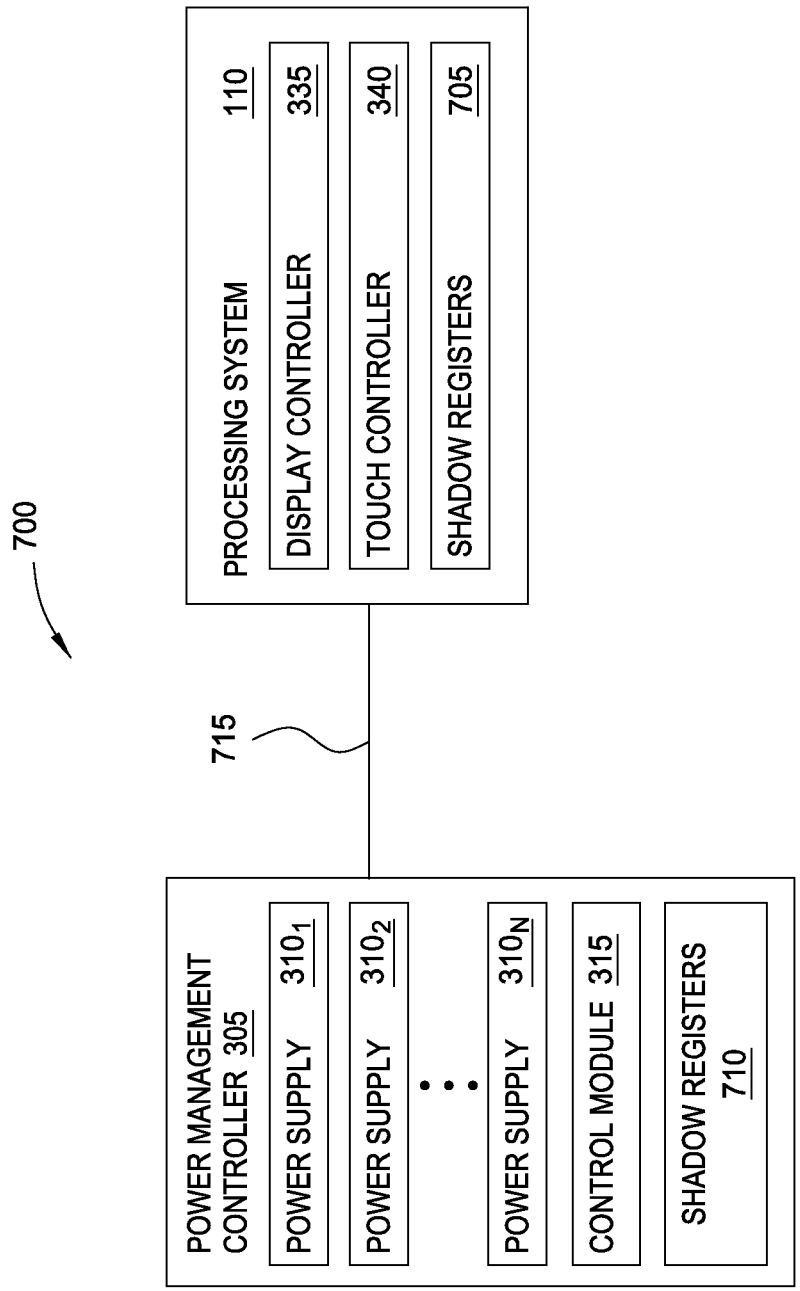
FIG. 7 is a schematic block diagram of a system that includes a communication path for facilitating communication between the processing system and a power management controller, according to an embodiment described herein.

FIG. 7 is a schematic block diagram of a system 700 that includes a communication path for facilitating communication between the processing system and a PMC 305, according to an embodiment described herein. As mentioned previously, processing system 110 and PMC 305 may include a communication path 715 that permits data transfer between the display and touch controllers 335, 340 and the control module 315. In one embodiment, the communication path 715 which enables the synchronization described in the present disclosure may be integrated into an already existing communication path used to perform some other function of system 700—e.g., display updating. For example, path 715 may be implemented into a Mobile Industry Processor Interface (MIPI) as a new command set. Thus, communication path 715 may either be an independent, discrete link or use an existing communication interface.

In one embodiment, processing system 110 and PMC 305 may perform a handshaking technique to enable processing system 110 to control the functions of PMC 305 (e.g., the switching frequency or duration of the stages). For example, the processing system 110 may be the master while the PMC 305 is the slave (or vice versa). The slave device may include a plurality of registers (not shown) which the master device may access to transmit instructions. The slave device may monitor the registers and update its settings based on the bits stored therein. In one embodiment, the processing system 110 and PMC 305 may synchronize their respective clock signals before synchronizing the switching frequency to the display and touch events.

System 700 also includes shadow registers 705, 710 located on both processing system 110 and PMC 305. Processing system 110 and PMC 305 may include logic for updating the shadow registers based on their current state. For example, when switching from display updating to touch sensing, processing system 110 may change a bit value in a shadow register 705 that stores the state information of the processing system 110. In response to updating a shadow register 705 in processing system 110, logic in the processing system 110 may automatically push out the update to a corresponding shadow register 710 in PMC 305. Similarly, if the control module 315 changes the switching period of the switched power supplies, PMC 305 may update one of the shadow registers 710. In response, logic within the PMC 305 may automatically push this change out to a shadow register 705 in processing system 110 that is also assigned to store the current switching period of the switched power supplies 310. In this manner, the shadow registers 705, 710 may be copies of each other. Accordingly, the shadow registers 705, 710 may serve as intermediaries that the control module 315 or display and touch controllers 335, 340 may poll or change without directly using communication path 715. For example, to instruct the control module 315 to adjust the switching frequency, the touch controller 340 may change the value in the appropriate shadow register 705 to indicate that the processing system 110 is currently performing touch sensing. Because hardware or firmware logic in processing system 110 automatically pushes this state information to the corresponding shadow register 710 in PMC 305, the control module 315 only needs to detect when a local shadow register 710 has changed values to know that the switching frequency should be adjusted.

In addition to informing the PMC 305 of the current state of the processing system 110, the display and touch controllers 335, 340 may either set the switching frequency used by the switched power supplies directly or provide the duration of the touch event or display event so that the control module 315 can determine the appropriate switching frequency based on, e.g., predetermined timing settings. These predetermined settings may be part of profiles that are pre-loaded in the PMC 305. Because the PMC 305 may not have the specific characteristics of the display or touch areas of the electronic device (e.g., the width or length), the PMC 305 may use the instructions provided by the controllers 335, 340 to switch between the predefined profiles rather than calculating the switching frequency on the fly. In this manner, the PMC 305 may be preloaded with custom profiles based on the particular display or touch area in electronic device or the processing system 110 may transmit the predetermined settings to the PMC 305 based on preloaded profiles stored in the processing system 110.

For example, the duration of the touch events may change based on the noise in the environment. To avoid the noise, touch controller 340 may decide to use a different frequency for the transmitter signal thereby changing the duration of the touch event. Thus, if the processing system 110 were to inform the PMC 305 only of its current state—i.e., display updating or touch sensing—the control module 315 may adjust the switching frequency based on an outdated touch event duration. Accordingly, regardless of the communication method used to transfer information between processing system 110 and PMC 305 (e.g., shadow registers, SPI, I²C, MIPI and the like), the processing system 110 may transfer the current durations of the touch display events in addition to the state information. In other embodiments, the communication path 715, which can transmit digital or analog communication connection, may also be used to transfer other information than state information and durations of the display and touch events. The processing system may use communication path 715 to account for voltage drop resulting from transmitting voltages from the PMC 305 to processing system 110. For example, power supply $310_1$ may output 4.0V that, due to resistive losses, may be only 3.7V at the input of processing system 110. Using path 715, processing element 110 can inform to control module 315 of PMC 305 of this drop which in turn may adjust the settings of power supply $310_1$ to compensate for the drop—e.g., output 4.3V.

In one embodiment, the PMC 305 may include logic for detecting if a battery has been pulled from a mobile electronic device. The system 700 may want to detect such an occurrence so that the pixels in the display screen may be discharged to prevent the current image from unpredictably fading or burning in. Thus, PMC 305 may include logic for determining when a battery is disconnected from the system 700 and sending an instruction to the display controller 335 to, for example, discharge the pixels.

In one embodiment, the PMC 305 may include logic for allowing the voltage output from the battery to be passed through to the processing system 110. For example, during a low-power state, the PMC 305 may deactivate the power supplies 310 and instead pass through the voltage from the battery to the processing system 110. This power may be sufficient for the touch controller 340 to detect a wake up gesture used by the user to instruct the electronic device to resume normal operation. Once this gesture is detected, the touch controller 340 may transmit an instruction via communication path 715 to the control module 315 to activate power supplies 310 and no longer pass through the battery voltage directly to the processing system 110.

In one embodiment, PMC 305 may use communication path 715 to instruct the processing system 110 to behave differently rather than the processing system 110 controlling the behavior of PMC 305 as described in the previous embodiments. As discussed in FIG. 3, PMC 305 may receive power from a power storage element 325 or from a power converter (e.g., a battery charger). Knowing that the electronic system is connected to a power converter may change the behavior of the processing system 110. For example, a battery charger may produce noise at a certain frequency, and thus, a processing system 110 may include circuitry for detecting this noise and changing the frequency of the transmitter signal used to perform touch sensing. Instead of solely relying on this circuitry, the processing system 110 may learn from the PMC 305 that a battery charger (or other power converter) is coupled to the electronic device and change the frequency used by the transmitter signal. In another example, when coupled to a power converter, the processing system 110 may be unable to use a different voltage than the one provided by the power converter for certain voltages (e.g., VDDA must be maintained at 5V) in order to prevent harm to the power converter. However, the processing system 110 may be able to perform display updating and touch sensing at a different voltage (e.g., VDDA at 4.6V). Accordingly, when the PMC 305 informs the processing system 110 (using the shadow registers 705, 710 or any other communication technique) that the power storage element is sourcing power rather than the power converter, the processing system 110 may operate at the lower voltage, thereby yielding a power savings.

CONCLUSION

Various embodiments of the present technology provide input devices and methods for improving usability. Specifically, embodiments described herein synchronize the switching frequency of switched power supplies with timing events associated with updating a display screen or performing touch sensing. For example, a touch event may be the time needed for the touch controller to scan a plurality of sensing electrodes. Because the noise is introduced each time the power supplies switch between different stages, the touch controller may instruct the power management controller to switch between the stages (i.e., adjust the switching frequency) at the same time during each touch event. For example, the switched power supply may change stages at the beginning and in the middle of each time event. Even though the switched power supplies are permitted to introduce noise into the touch system, the noise happens at the same time during each touch event. Accordingly, the effect of the noise is the same for each touch event, and thus, is cancelled out. A similar process may be done during display updating.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. An electronic device comprising: a power management controller configured to provide power to both a display controller configured to update a display screen and a touch controller configured to detect interaction between an input object and a sensing region, wherein the power management controller is configured to communicate with the display and touch controllers to adjust a switching frequency of a power supply to be synchronous with display timing and touch timing, wherein a first switching period of the power supply used when performing capacitive sensing is an integer multiple of a duration of a plurality of repeated touch events, and wherein a second switching period of the power supply used when updating the display screen is an integer multiple of the duration of a plurality of repeated display events, wherein the first switching period is different from the second switching period.

2. The electronic device of claim 1, wherein the power management controller is configured to use a first switching frequency when the display controller is updating the display screen and a second, different switching frequency when the touch controller is detecting interaction between the input object and the sensing region.

3. The electronic device of claim 2, wherein the first switching frequency is derived based on a duration of the repeated display events performed when updating the display screen and the second switching frequency is derived based on a duration of the repeated touch events performed when detecting interaction between the input object and the sensing region, wherein the display events and touch events do not overlap in time.

4. The electronic device of claim 1, wherein updating the display screen and detecting interaction between the input object and the sensing region overlap, at least partially, in time.

5. The electronic device of claim 1, wherein the power management controller is configured to transmit a signal to at least one of the display and touch controllers in response to a power converter being connected to the electronic device.

6. The electronic device of claim 1, further comprising an integrated circuit comprising the touch controller and the display device, wherein the power management controller is external to the integrated circuit.

7. The electronic device of claim 1, further comprising:
a first integrated circuit comprising the display and touch controller; and
an interconnect communicatively coupling the integrated circuit to a second integrated circuit comprising the power management controller, wherein the power supply is located on the second integrated circuit and is a switched power supply configured to perform a DC to DC voltage conversion.

8. A method for synchronizing a power management controller, the method comprising: providing power from a power management controller to both a display controller configured to update a display screen and a touch controller configured to detect interaction between an input object and a sensing region; and communicating with the display and touch controllers to adjust a switching frequency of a power supply to be synchronous with display timing and touch timing, wherein a first switching period of the power supply used when performing capacitive sensing is an integer multiple of a duration of a plurality of repeated touch events, and wherein a second switching period of the power supply used when updating the display screen is an integer multiple of the duration of a plurality of repeated display events, wherein the first switching period is different from the second switching period.

9. The method of claim 8, wherein the power management controller is configured to use a first switching frequency when the display controller is updating the display screen and a second, different switching frequency when the touch controller is detecting interaction between the input object and the sensing region.

10. The method of claim 9, wherein the first switching frequency is derived based on a duration of the repeated display events performed when updating the display screen and the second switching frequency is derived based on a duration of the repeated touch events performed when detecting interaction between the input object and the sensing region, wherein the repeated display events and touch events do not overlap in time.

11. The method of claim 8, wherein updating the display screen and detecting interaction between the input object and the sensing region overlap, at least partially, in time.

12. The method of claim 8, further comprising, upon determining that the power management controller is coupled to a removable power converter, transmitting a signal from the power management controller that informs at least one of the display and touch controllers of the presence of the removable power converter.

13. The method of claim 8, wherein the touch controller and the display device are integrated in a semiconductor chip, and wherein the power management controller is external to the semiconductor chip.

14. The method of claim 8, wherein the touch controller and the display device are integrated in a first semiconductor chip and an interconnect communicatively couples the first semiconductor chip to a second semiconductor chip comprising the power management controller, wherein the power supply is located on the second integrated circuit and is a switched power supply configured to perform a DC to DC voltage conversion.

15. An integrated circuit system comprising: a power management controller configured to provide power to both a display controller configured to update a display screen and a touch controller configured to detect interaction between an input object and a sensing region; and a switched power supply, wherein the power management controller is configured to communicate with the display and touch controllers to adjust a switching frequency of the switched power supply to be synchronous with display timing and touch timing, wherein a first switching period of the power supply used when performing capacitive sensing is an integer multiple of a duration of a plurality of repeated touch events, and wherein a second switching period of the power supply used when updating the display screen is an integer multiple of the duration of a plurality of repeated display events, wherein the first switching period is different from the second switching period.

16. The integrated circuit of claim 15, wherein the power management controller is configured to use a first switching frequency when the display controller is updating the display screen and a second, different switching frequency when the touch controller is detecting interaction between the input object and the sensing region.

17. The integrated circuit of claim 16, wherein the first switching frequency is derived based on a duration of the repeated display events performed when updating the display screen and the second switching frequency is derived based on a duration of the repeated touch events performed when detecting interaction between the input object and the sensing region, wherein the repeated display events and touch events do not overlap in time.

18. The integrated circuit of claim 15, wherein updating the display screen and detecting interaction between the input object and the sensing region overlap, at least partially, in time.

19. The integrated circuit of claim 15, wherein the power management controller is configured to transmit a signal to at least one of the display and touch controllers in response to a power converter being connected to the electronic device.

20. The integrated circuit of claim 15, further comprising shadow registers configured to store display and touch settings corresponding to the display and touch controllers.

21. The electronic device of claim 1, wherein a first switching period of the power supply used when the touch controller is detecting interaction between the input object and the sensing region is derived from a duration of a plurality of repeated touch events, and wherein a second switching period of the power supply used when updating the display screen is derived from a duration of a plurality of repeated display events, wherein the first switching period is different from the second switching period.

22. The electronic device of claim 21, wherein the first switching period is an integer multiple of the duration of the plurality of repeated touch events and the second switching period is an integer multiple of the duration of the plurality of repeated display events.

* * * * *